United States Patent [19]
Willikens

[11] Patent Number: 5,039,869
[45] Date of Patent: Aug. 13, 1991

[54] DEVICE FOR SWITCHING A REAR FOG LAMP ON A VEHICLE

[75] Inventor: Axel Willikens, Waiblingen, Fed. Rep. of Germany

[73] Assignee: Daimler-Benz AG, Fed. Rep. of Germany

[21] Appl. No.: 433,537

[22] Filed: Nov. 8, 1989

[30] Foreign Application Priority Data

Dec. 5, 1988 [DE] Fed. Rep. of Germany ....... 3840885

[51] Int. Cl.⁵ ............................................. B60L 1/14
[52] U.S. Cl. .................................. 307/10.8; 340/431; 315/77; 315/82
[58] Field of Search ...................... 340/431, 458, 468; 315/76, 77, 82, 83; 307/10.8

[56] References Cited

U.S. PATENT DOCUMENTS

| | | | |
|---|---|---|---|
| 3,514,623 | 5/1970 | Ballard | 340/431 |
| 4,064,413 | 12/1977 | Andersen | 340/431 |
| 4,325,052 | 4/1982 | Koerner | 340/431 |
| 4,857,807 | 8/1989 | Hargis | 340/431 |
| 4,939,503 | 7/1990 | Swanson | 340/431 |

*Primary Examiner*—A. D. Pellinen
*Assistant Examiner*—Jeffrey A. Gaffin
*Attorney, Agent, or Firm*—Evenson, Wands, Edwards, Lenahan & McKeown

[57] ABSTRACT

A device for controllably switching a rear fog lamp on a vehicle utilizes a switch located in the current path to sense the current flow of a rear fog lamp of a trailer attached to the vehicle. In order to prevent disturbing reflections of the light of a vehicle rear fog lamp of the trailer into the vehicle interior via a front wall of the trailer, during the connection of a trailer rear fog lamp to the vehicle, the vehicle rear fog lamp is switched off automatically by means of the device, with the trailer rear fog lamp remaining intact.

4 Claims, 1 Drawing Sheet

5,039,869

DEVICE FOR SWITCHING A REAR FOG LAMP ON A VEHICLE

BACKGROUND AND SUMMARY OF THE INVENTION

The invention relates to a switching device for a rear fog lamp of a vehicle. More particularly, the invention relates to a device which prevents undesirable reflections of light from the vehicle rear fog lamp from a front surface of a trailer coupled to the vehicle and checks the operability of a rear fog lamp of the trailer.

It is generally known that a rear fog lamp of a vehicle can be switched on and off by a switch arranged in the vehicle near a dashboard.

If a trailer can also be coupled to the vehicle via a trailer device, and if this trailer likewise has a rear fog lamp, then a plug connection may be made between the fog lamp circuits. Accordingly, when the rear fog lamp of the vehicle is switched on, the trailer rear fog lamp will also light up. At the same time, however, there can be undesirable reflections from the rear fog lamp of the vehicle into the vehicle interior via the front wall of the trailer, for example a caravan.

It is desirable to prevent the driver's rear view from being impaired by the reflection of the intense red light on the front of the trailer when the rear fog lamp of the vehicle is switched on. In German Published, Unexamined patent application No. 2,908,517, a switch component is mechanically activated when a trailer plug is inserted into a plug socket on the vehicle, thereby interrupting the current path to the vehicle rear fog lamp. Thus, when the switch for the rear fog lamp is switched on, only the trailer rear fog lamp lights up. However, should the trailer rear fog lamp fail as a result of a defect, there is no longer any functioning of a rear fog lamp at all.

Therefore, an object of the present invention is to provide a device which, when a vehicle is driven with a trailer, prevents undesirable light reflections, at the same time allows a check of the functioning of a trailer rear fog lamp and, if the trailer rear fog lamp is defective, maintains the functioning of a rear fog lamp of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
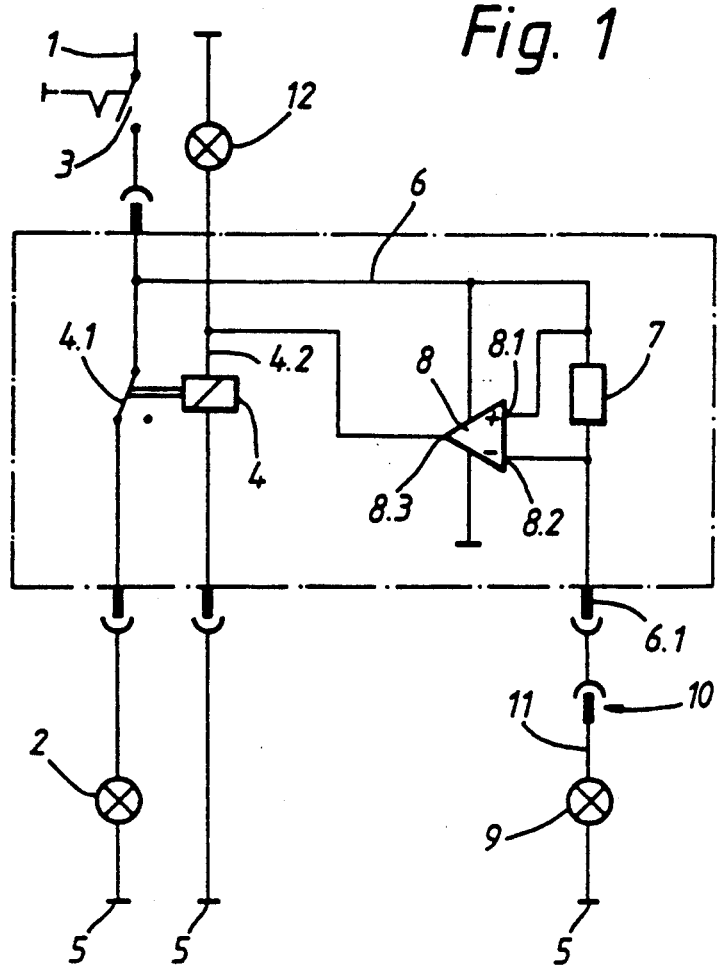
FIG. 1 is a circuit diagram of one embodiment of the present invention.

Exemplary embodiments of the invention are illustrated in the drawings and described in detail below.

As is evident from FIG. 1, located in a current path 1 to a rear fog lamp 2 of a vehicle is a randomly actuable switch 3 for switching the rear fog lamp 2 on and off. Furthermore, a circuit breaker 4.1 of a relay 4, grounded at 5 on one side in the same way as the rear fog lamp 2, is connected in series in the current path 1, specifically in such a way that, when the relay 4 is in a non-energized state, the circuit breaker 4.1 does not interrupt the current path 1.

A line 6 branches off from the current path 1 between the switch 3 and the circuit breaker 4.1, into which a resistor 7 is inserted as a current sensor and the end of which has a contact 6.1. Connected in parallel to the resistor 7 are positive/negative inputs 8.1 and 8.2 of a differential amplifier 8, an output 8.3 of which is connected to an activating input 4.2 of the relay 4.

When a line 11 of a rear fog lamp 9 of a trailer is connected to the contact 6.1, which can be integrated into a trailer plug socket 10, and when the switch 3 is switched on, a current flows via the current path 1 and the line 6 and causes a voltage drop across the resistor 7. The differential amplifier 8 records this voltage difference at its inputs and applies a positive output voltage at its output 8.3, as a result, the relay 4 is energized and the current path 1 to the rear fog lamp 2 of the vehicle is interrupted by the circuit breaker 4.1, while the trailer rear fog lamp 9 lights up. If, however, there is an interruption in the line 11, for example if a trailer rear fog lamp 9 is defective, the relay 4 remains non-energized and the circuit breaker 4.1 remains closed. The rear fog lamp 2 of the vehicle thus continues to light up. A defect in the circuit of the trailer rear fog lamp 9 can, at the same time, be signalled to the driver by the extinguishing of a pilot light 12.

Figure 2:
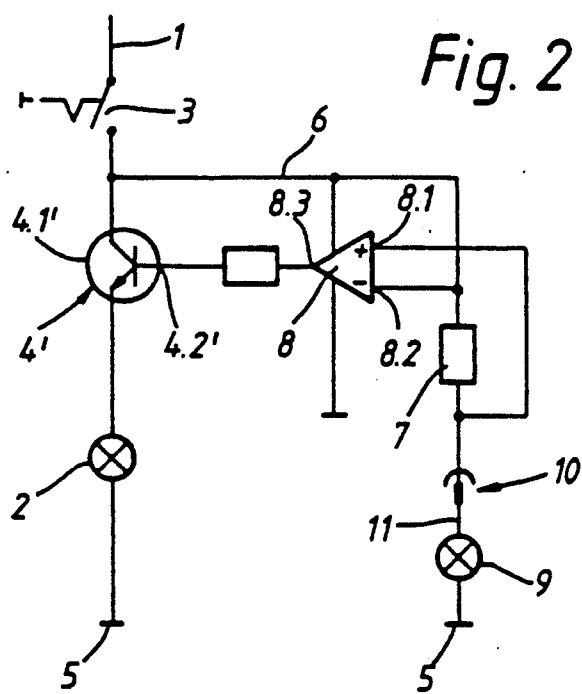
FIG. 2 is an alternative embodiment wherein a switching component is an electronic switch.

Whereas, in FIG. 1, the switch component which, when activated, interrupts the current path 1 is designed as an electrical relay 4 with a circuit breaker 4.1, in the embodiment of FIG. 2 the switch component is designed as an electronic switch, for example a transistor 4' which has a collector-emitter stage 4.1' located in the current path 1 and a base connected as an activating input 4.2' to the output 8.3 of the differential amplifier 8. Thus, if the trailer rear fog lamp 9 is not connected or is connected and defective, the output 8.3 has a positive potential, meaning that the transistor 4' is conductive and the vehicle rear fog lamp 2 consequently lights up, and, if the trailer rear fog lamp 9 is connected and intact, the output 8.3 has a negative potential, with the result that the current path 1 to the vehicle rear fog lamp 2 is interrupted by the transistor 4'.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for controllably switching a vehicle rear fog lamp comprising:
    a vehicle rear fog lamp current path;
    a switch for actuating the vehicle rear fog lamp;
    a switch component which, when activated, interrupts the vehicle rear fog lamp current path;
    a line branched off from the vehicle rear fog lamp current path between the switch and the switch component;
    a circuit condition detector inserted in the line;
    an electronic amplifier having inputs coupled to the circuit condition detector in parallel and an output which is coupled to be an activating input of the switch component; and
    a free end of the line being equipped with a contact for the connection of a trailer rear fog lamp.

2. A device according to claim 1, wherein the switch component is an electrical relay and the circuit condition detector is a resistor.

3. A device according to claim 1, wherein the switch component is a transistor.

4. A device according to claim 1, wherein the contact is integrated into a trailer plug socket.

* * * * *